United States Patent
Stewart et al.

(10) Patent No.: US 6,869,122 B2
(45) Date of Patent: Mar. 22, 2005

(54) PROTECTIVE LAYER FOR AUTOMOTIVE SURFACES

(75) Inventors: Eric Stewart, Cornelius, NC (US); Nick Mark Carter, Mooresville, NC (US)

(73) Assignee: Polymer Group, Inc., North Charleston, SC (US)

( * ) Notice: Subject to any disclaimer, the term of this patent is extended or adjusted under 35 U.S.C. 154(b) by 137 days.

(21) Appl. No.: 10/282,814

(22) Filed: Oct. 29, 2002

(65) Prior Publication Data

US 2003/0119392 A1 Jun. 26, 2003

Related U.S. Application Data

(60) Provisional application No. 60/345,896, filed on Oct. 29, 2001.

(51) Int. Cl.[7] .............................................. B62D 33/00
(52) U.S. Cl. ...................... 296/39.1; 442/327; 442/401; 442/408
(58) Field of Search ...................... 296/39.1; 492/327; 442/76, 401, 408, 32, 59, 394, 38, 148, 164

(56) References Cited

U.S. PATENT DOCUMENTS

| | | | |
|---|---|---|---|
| 3,260,778 A | | 7/1966 | Walton |
| 3,416,192 A | | 12/1968 | Packard |
| 3,494,821 A | * | 2/1970 | Evans ........................ 442/352 |
| 3,810,280 A | | 5/1974 | Walton et al. |
| 4,090,385 A | | 5/1978 | Packard |
| 4,259,222 A | | 3/1981 | Login et al. |
| 4,717,329 A | | 1/1988 | Packard et al. |
| 4,765,671 A | | 8/1988 | Allen |
| 5,007,670 A | * | 4/1991 | Wise ........................ 296/39.1 |
| 5,417,465 A | | 5/1995 | Koppenstein |
| 5,491,021 A | | 2/1996 | Tolliver |
| 5,635,290 A | | 6/1997 | Stopper et al. |
| 5,735,565 A | | 4/1998 | Papai et al. |
| 5,769,479 A | | 6/1998 | Emery |
| 5,899,519 A | * | 5/1999 | Doshi ........................ 296/39.2 |
| 5,904,390 A | | 5/1999 | Emery et al. |
| 6,017,057 A | | 1/2000 | O'Docherty |
| 6,245,694 B1 | * | 6/2001 | Davenport et al. ......... 428/372 |
| 6,322,658 B1 | | 11/2001 | Byma et al. |
| 6,410,465 B1 | * | 6/2002 | Lim et al. ................... 442/327 |
| 6,548,432 B1 | * | 4/2003 | Hisada et al. .............. 442/327 |
| 2002/0140247 A1 | * | 10/2002 | Emery ....................... 296/39.1 |

* cited by examiner

*Primary Examiner*—Lori L. Coletta
(74) *Attorney, Agent, or Firm*—Wood, Phillips, Katz, Clark & Mortimer

(57) ABSTRACT

A protective layer embodying the principles of the present invention is configured for protection of automotive surfaces, including specifically, the protection of a truck-bed against wear induced by a truck-bed liner. The protective layer has a substantially planar configuration sized to permit the layer to be positioned generally between an associated truck-bed liner and a truck-bed, whereby the abrasion is significantly reduced. The layer comprises a fibrous nonwoven fabric formed from fibrous and/or filamentary elements, with the fibrous nonwoven fabric exhibiting a sufficiently reduced coefficient of friction and sufficient durability to absorb or distribute abrasive actions, while allowing passage of moisture, thus protecting the automotive surfaces against potentially detrimental environmental conditions.

6 Claims, 3 Drawing Sheets

ITD thickness: 0.25"
Thickness at Drainage: 0.15"
Nub Height: 0.08"

FIG. 3
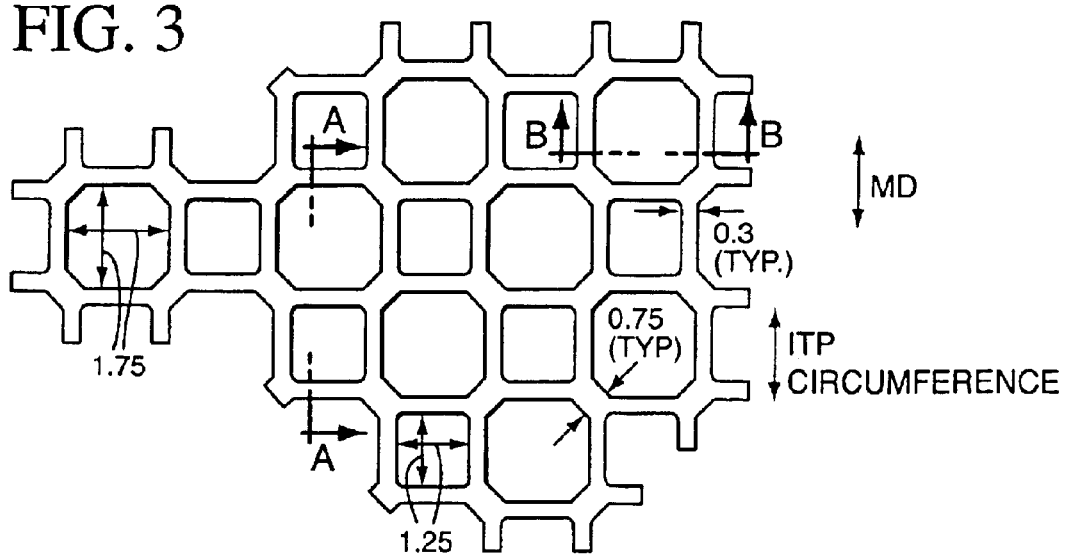
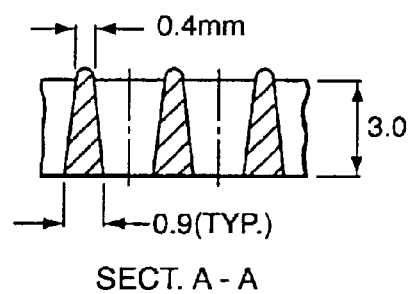
SECT. A - A
FIG. 3A
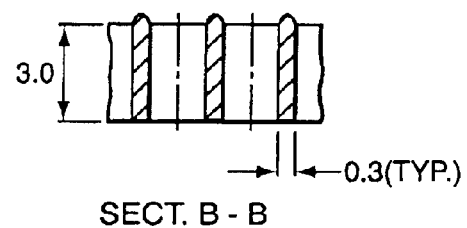
SECT. B - B
FIG. 3B
FIG. 3C
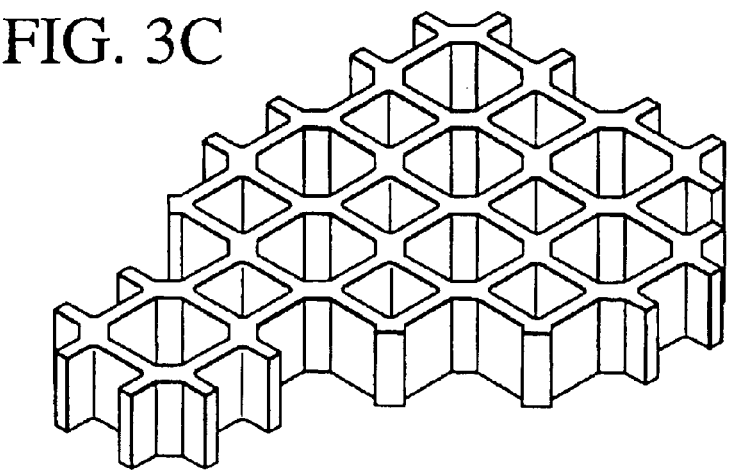

PROTECTIVE LAYER FOR AUTOMOTIVE SURFACES

TECHNICAL FIELD

The present invention relates generally to an arrangement for protecting automotive surfaces, including protection of the surfaces when in contact with abrasive agents, and more particularly, to a nonwoven fabric protective layer which aids in reducing abrasion between a truck-bed and a truck-bed liner.

BACKGROUND OF THE INVENTION

Personal utility vehicles, in particular "pick-up" type trucks, have experienced an ever growing popularity due to the number of diverse tasks such vehicles can accomplish. Pick-up type trucks are favored by both limited-application residential users and commercial services for the ability to employ the truck-bed of this type of truck as a means for transporting large, heavy, and/or fouled materials. Such materials can be quickly and repeatedly transported without the need for exorbinant consumption of time required to cleanse the truck-bed after use.

Repeated use of pick-up type truck to transport large, heavy, or fouled materials tends to induce excessive wear of the truck-bed. The wearing of the truck-bed has deleterious effects in terms of both aesthetic qualities as well as the continued performance of the truck-bed. Scratches and dents tend to wear the paint away from the truck-bed, which detracts away from the appearance of cleanliness. More significantly, removal or loss of the paint of the truck-bed results in increased opportunity for oxidation and rusting of the metallic substrate there beneath. If the oxidation and rusting of the metallic substrate is allowed to continue, the metallic substrate will degrade and eventually fail.

To remedy the wear induced in the truck-bed, various constructs have been employed which fit in, and conform to, the profile of the truck bed, and are referred to as "truck-bed liners". Typically, truck-bed liners are formed from a durable plastic substrate, which is thermoformed or cast in the shape and profile for a specific truck-bed, as represented by U.S. Pat. Nos. 5,735,565, 5,769,479, 5,904,390, and 6,017,057, all incorporated herein by reference. Application of the truck-bed liner into the truck-bed thus allows for a "sacrificial" surface, which is intended to receive the wear of use.

However, it has been found that the use of a truck-bed liner does not obviate the problem of wear of the truck-bed surface. Due to the need to fit the truck-bed liner, a certain amount of undermolding, or slack, is incorporated into the shape of the truck-bed liner. This slack, compounded by vibrations induced in movement of the truck-bed, results in the truck-bed liner rubbing against the painted surface of the truck-bed. Over time, and with continued abrasion, oxidation and rusting of the metallic substrate of the truck-bed begins to occur. As the truck-bed liner obscures and/or prevents the ready recognition of this destruction of the truck-bed itself, the extent of damage is not obvious until critical failure occurs.

Other kinds of truck-bed liners are practiced wherein a polymeric material is sprayed or painted directly into the truck-bed. While such directly applied liners remove much of the problem of the wear induced by a truck-bed liner, the use of a directly applied liner is essentially permanent, which can pose an issue if a different liner is required or the vehicle is leased.

The present invention provides an improved form of abrasion protective layer for automotive surfaces, which is particularly suited for use between a truck-bed and an inserted truck-bed liner.

SUMMARY OF THE INVENTION

A protective layer embodying the principles of the present invention is configured for protection of automotive surfaces, including specifically, the protection of a truck-bed against wear induced by a truck-bed liner. The protective layer has a substantially planar configuration sized to permit the layer to be positioned generally between an associated truck-bed liner and a truck-bed, whereby the abrasion is significantly reduced. The layer comprises a fibrous nonwoven fabric formed from fibrous and/or filamentary elements, with the fibrous nonwoven fabric exhibiting a sufficiently reduced coefficient of friction and sufficient durability to absorb or distribute abrasive actions, while allowing passage of moisture, thus protecting the automotive surfaces against potentially detrimental environmental conditions.

The fibrous nonwoven fabric of the layer comprises fibrous material selected from the group consisting of thermoplastic polymers, thermoset polymers, natural fibers, and combinations thereof. The fibrous material of the nonwoven fabric can be heat-bonded, adhesive-bonded, or hydroentangled (spunlaced) to provide the fabric with the desired degree of integrity. The fibrous nonwoven fabric may be formed from filamentary elements by providing the fabric in the form of spunbond polymeric material.

The protective layer of the present invention can be provided with additional features to facilitate its effective use for protection of automotive surfaces. If desired, the nonwoven fabric may comprise a reinforcing scrim, which may be integrated into the fabric by hydroentanglement. In addition, natural and synthetic fibers can be used in the construction of the protective layer, which will enable, or further enhance, the ability of the protective layer to wick moisture. When the fibrous nonwoven fabric comprises polymeric material, the polymeric material may incorporate one or more protection enhancing agents such as vapor-corrosion inhibitors and lubricous agents. Such protection-enhancing agents can be provided in the form of a melt-additive in the polymer, as a fiber surface treatment, and/or as a topical treatment applied to the nonwoven fabric. Pigmenting agents may also be employed.

A method of protecting automotive surfaces in accordance with the present invention comprises the steps of providing at least one piece of nonwoven fabric formed from fibrous and/or filamentary elements, and forming a substantially planar sheet from the nonwoven fabric. Said substantially planar sheet can then be either laid into a truck-bed prior to inserting a truck-bed liner, or by affixing the substantially planar sheet to the truck-bed liner prior to inserting into the truck-bed. To further improve performance of the abrasion protective layer, one or more pieces may be affixed by suitable joining means, to form a layer that conforms to either the profile of the truck-bed or to the truck-bed liner.

The present method further includes cutting the sheet to a selected length to form a protective layer, and positioning the protective layer generally between a truck-bed and truck-bed liner to protect the truck-bed from abrasion and/or moisture. The nonwoven fabric may comprise heat-bonded polymeric staple length fibers, adhesive-bonded fibrous material, substantially continuous polymeric filaments, and the combinations thereof.

The nonwoven fabric employed in the protective layer of the present invention can, for some applications, be non-apertured, with the fabric itself providing the desired abrasion resistance and breathability. For some applications, it can be desirable to form three-dimensional patterns of extended nubs and/or apertures in protective layer to further enhance performance.

Other features and advantages of the present invention will become readily apparent from the following detailed description, the accompanying drawings, and the appended claims.

BRIEF DESCRIPTION OF THE DRAWINGS

FIG. 3 is a diagrammatic view of a forming surface for forming a nonwoven fabric for use in practicing the present invention;

FIGS. 3A–3C are diagrammatic views of a further forming surface for hydroentangling a nonwoven fabric for practice of the present invention.

DETAILED DESCRIPTION

Figure 1:
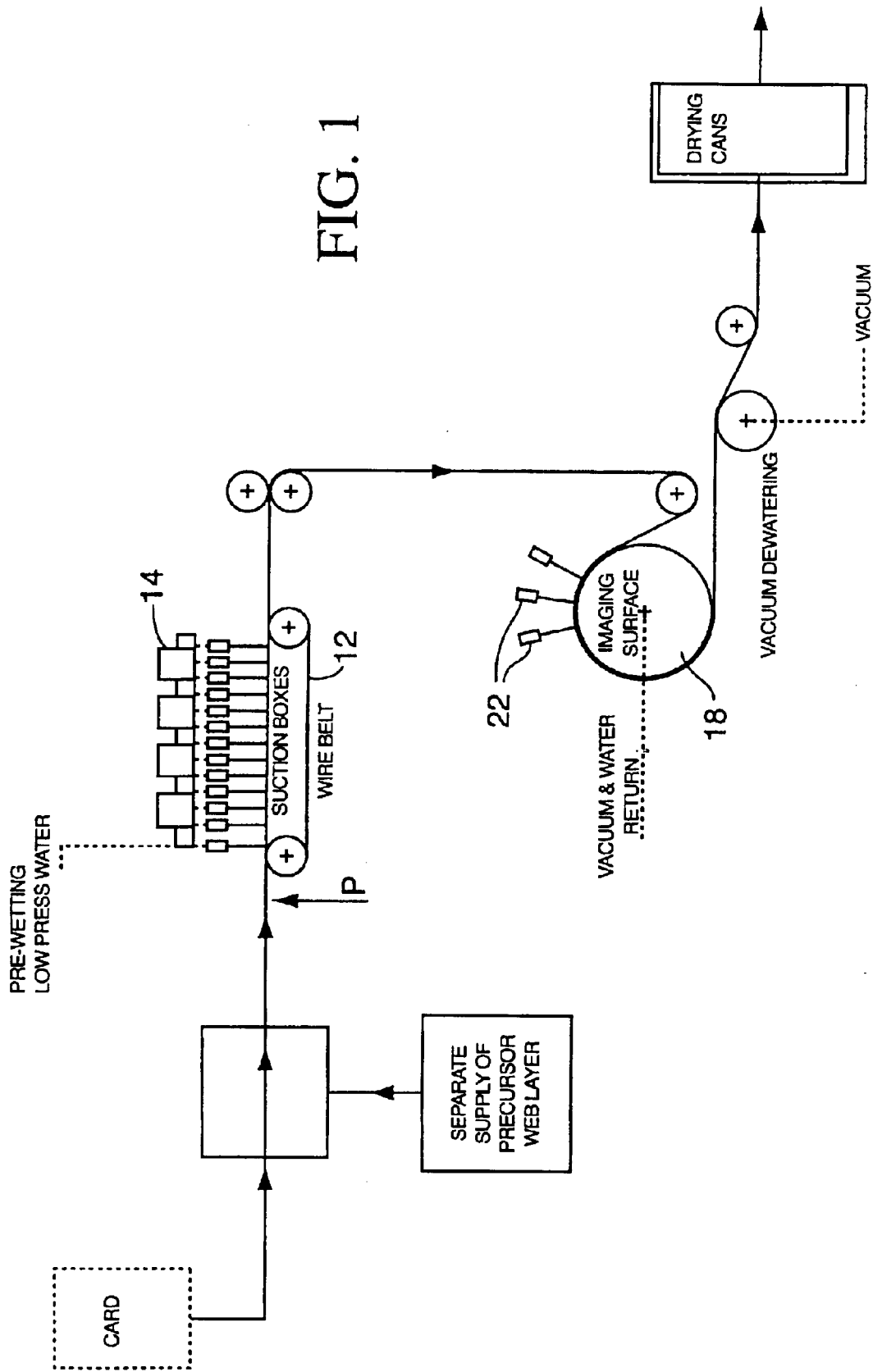
FIG. 1 is a diagrammatic view of a forming apparatus for forming a nonwoven fabric for use as a protective layer for automotive surfaces in accordance with the principles of the present invention.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

The present invention is directed to a protective layer for automotive surfaces which is particularly suited for use between truck-bed liners and truck-beds. During use of the protective layer, potential abrasion and wear induced by the truck-bed liner is absorbed or dispersed by the protective layer, while at the same time providing vapor permeability or breathability to assure that the automotive surfaces retain metallic substrate integrity.

The protective layer has a substantially planar configuration sized to permit the layer to be positioned generally between an associated truck-bed liner and a truck-bed, whereby the abrasion is significantly reduced. The layer comprises a fibrous nonwoven fabric formed from fibrous and/or filamentary elements, with the fibrous nonwoven fabric exhibiting sufficiently a reduced coefficient of friction and sufficient durability to absorb or distribute abrasive actions, while allowing passage of moisture, thus protecting the automotive surfaces against potentially detrimental environmental conditions.

The fibrous nonwoven fabric comprises fibrous material selected from the group consisting of thermoplastic polymers, thermoset polymers, natural fibers, and combinations thereof. The fibrous nonwoven fabric may be formed from filamentary elements when the fabric is provided in the form of a spunbond polymeric material. The nonwoven fabric preferably has a basis weight from about 10 to 500 $gM/m^2$, and in one especially preferred form, comprises polyester staple length fibers that are heat-bonded.

The present protective layer can be differently configured to facilitate its cost-effective use for protection of automotive surfaces. For some applications, it can be desired to incorporate a reinforcing scrim in the fabric, with formation of the fibrous nonwoven fabric by hydroentanglement (spunlacing) facilitating incorporation of such a scrim. While it is contemplated that the nonwoven fabric may be non-apertured, for some applications, it can be desirable to apply a polymeric film layer to the nonwoven fabric, with the layer being apertured to provide the desired vapor permeability.

When the fibrous nonwoven fabric comprises polymeric material, the polymeric material may incorporate one or more protection enhancing agents such as vapor-corrosion inhibitors and lubricous agents. It is also contemplated that the polymeric material of the fabric may comprise a pigmenting agent. The protection-enhancing agents may be provided in the form of a melt-additive in the polymer from which the nonwoven fabric is formed, or may comprise a fiber surface treatment applied to the fibrous material from which the fabric is formed, prior to fabric formation. It is within the purview of the present invention that one or more of the protection-enhancing agents may comprise a topical treatment applied to the nonwoven fabric after it is formed.

In the following Examples, various techniques are described for formation of the nonwoven fabric from which the present protective layer is formed. At least one piece of nonwoven fabric is thereafter formed into a substantially planar sheet or combined with a plurality of nonwoven fabric pieces by affixing together adjoining edges portions thereof, to form the contemplated protective layer. The edge portions of the fabric may be joined by heat-bonding, adhesive-bonding, or sewing.

EXAMPLE 1
Thermal Bonded Carded Staple Fiber

The present protective layer was formed from nonwoven fabric comprised of a conventional carded staple length polyester fiber. The basis weight of the carded lap was 45 grams per square meter. The carded batt was thermally bonded by calender nip at a pressure of 450 pounds per linear inch, a calender anvil roll surface temperature of 300° F. to 310° F., a calender embossing roll surface temperature of 300° F. to 310° F., and a point pattern of 9% bond area relative to total surface area. The overall line speed for manufacturing the representative nonwoven fabric was approximately 400 feet per minute.

EXAMPLE 2
Spunbond Filamentary Elements

A bonded precursor web may be produced on a commercial spunbond production line using standard processing conditions. In particular, a polyester filament precursor web may be employed having a basis weight of 20 grams per square meter, and a filament denier of 1.8. The precursor web is bonded by calender at a calender temperature of 200 to 220 degrees C., and a nip pressure of 320 PLI.

EXAMPLE 3
Non-Apertured Spunlace Fabric

Using a forming apparatus as illustrated in FIG. 1, a nonwoven fabric was made in accordance with the present invention by providing a precursor web comprising 100 percent by weight polyester fibers as supplied by Wellman as Type T-472 PET, 1.2 dpf by 1.5 inch staple length. The precursor fibrous batt was entangled by a series of entangling manifolds such as diagrammatically illustrated in FIG. 1. FIG. 1 illustrates a hydroentangling apparatus for forming nonwoven fabrics in accordance with the present invention. The apparatus includes a foraminous forming surface in the form of belt 12 upon which the precursor fibrous batt P is positioned for pre-entangling by entangling manifold 14 including a plurality of sub-manifolds. In the present examples, each of the sub-manifolds of the entangling manifolds 14 included three orifice strips including 120 micron orifices spaced at 42.3 per inch, with three of the sub-manifolds successively operated at 100, 300, and 600 pounds per square inch, with a line speed of 45 feet per minute. The precursor web was then dried using two stacks of steam drying cans at 300° F. The precursor web had a basis weight of 1.5 ounce per square yard (plus or minus 7%).

The precursor web the received a further 2.0 ounce per square yard air-laid layer of Type-472 PET fibrous batt. The precursor web with fibrous batt was further entangled by a series of entangling sub-manifolds, with the sub-manifolds successively operated at 100, 300, and 600 pounds per square inch, with a line speed of 45 feet per minute. The entangling apparatus of FIG. 1 further includes an imaging drum 18 comprising a three-dimensional image transfer device for effecting imaging of the now-entangled layered precursor web. The image transfer device includes a moveable imaging surface which moves relative to a plurality of entangling manifolds 22 which act in cooperation with three-dimensional elements defined by the imaging surface of the image transfer device to effect imaging and patterning of the fabric being formed. The entangling manifolds 22 included 120 micron orifices spaced at 42.3 per inch, with the manifolds operated at 2800 pounds per square inch each. The imaged nonwoven fabric was dried using two stacks of steam drying cans at 300° F.

The three-dimensional image transfer device of drum 18 was configured with an image forming surface consisting of non-aperturing inducing pattern, as illustrated in FIG. 3.

EXAMPLE 4
Apertured Spunlace

Figure 2:
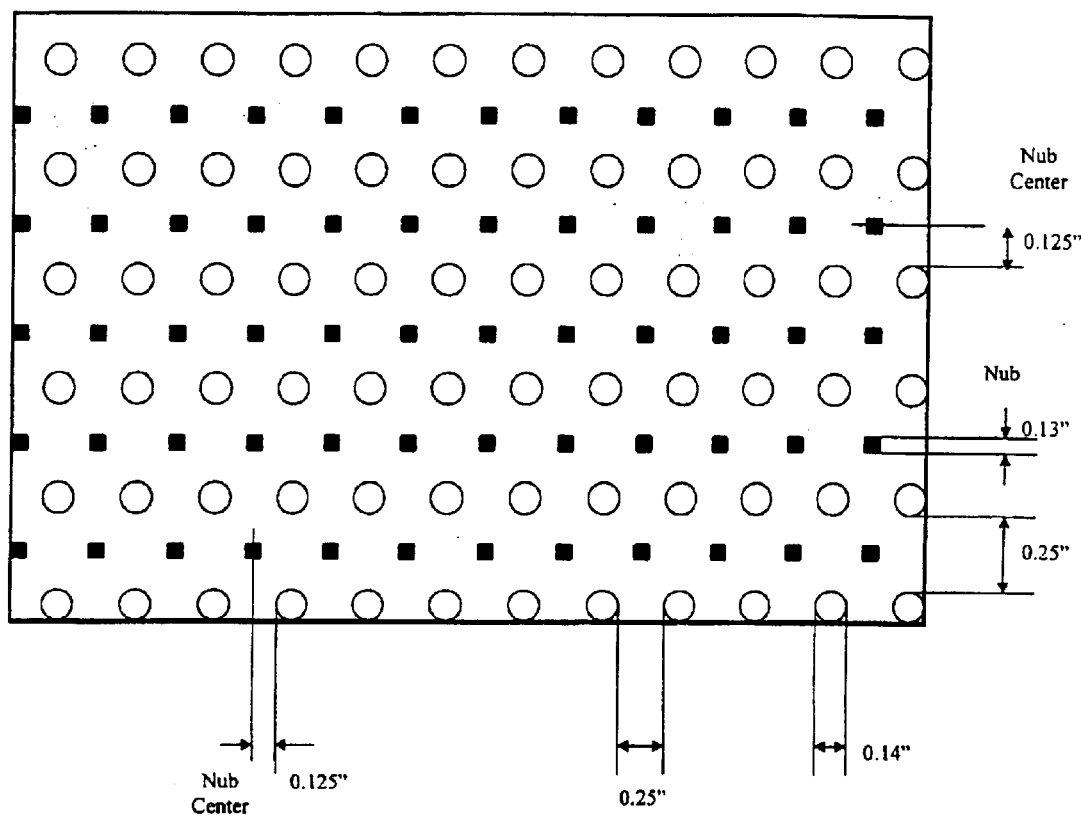
FIG. 2 is a diagrammatic view of a hydroentangling forming surface for formation of a nonwoven fabric for use in practicing the present invention.

A fabric was fabricated by the process of the above example, whereby in the alternative, drum 18 was configured with an image forming surface consisting of an aperture inducing pattern, as illustrated in FIG. 2.

EXAMPLE 5
Non-Apertured Spunlace with Scrim

A composite nonwoven fabric was formed with the arrangement of FIG. 1, wherein the imaging device 18 had an "octagon/square" imaging surface such as is illustrated in FIGS. 3 and 3A–3C. The entangled layer was produced using 1.5 denier polyester staple fibers at 1.5 inch staple length which were carded, cross-lapped and entangled using a Perfojet 2000 Jetlace entangler. The PET scrim layer 16 was a 7×5 mesh, 70 denier scrim available from Conwed Plastics of Minneapolis, Minn. A thermally bonded, 2.0 denier polyester thermally bonded fibrous layer was used as the bonded layer 20, with a 50 gsm target basis weight.

The fibrous layers were unwound at 40 feet per minute and impinged with three successive manifolds 22 each operating at 4000-psi pressure. Each manifold 22 had 120-micron diameter orifices spaced at 42.3 orifices per inch.

EXAMPLE 6
Spunbond with Film Extrusion

A base material was supplied in the form of a prewound roll of 85 gram per square meter (gsm) spunbond polypropylene having been previously hot calendered with a 14% land area pattern. To this base material a co-polyester film extrusion was applied by the use of a five zone extruder system. The co-polyester polymer blend was comprised of an ethyl methyl acrylate at 65% (w/w) and a co-polyester polymer at 35% (w/w). The five zone extruder was operated with each successive zone at 350° F., 450° F., 485° F., 525° F., and 515° F. The melt temperature of the molten film extrusion was 477° F. The cast station temperatures were 80° F. for the nip roll, 65° F. for the cast roll, and 70° F. for the stripper roll. The cast station roll pressures were 75 pounds per square inch for the nip roll and 60 pounds per square inch for the stripper roll. Overall line speed during the processing of this material was 51 feet per minute.

EXAMPLE 7
Mechanical Compaction of Nonwoven Fabric

Nonwoven fabrics may be further treated by mechanical compaction should the protective article require enhanced conformability.

Sanforizing

In order to enhance softness and drapeability of the present nonwoven fabric, the fabric may be subjected to slight mechanical compaction, such as by sanforizing (Sanforized® is a registered trademark of Cluett, Peabody & Co., Inc.). Such treatment has been found to enhance hand and drapeability of the fabric, without adversely affecting the mechanical characteristics of the fabric or being deleterious to the image imparted therein.

Micrexing

The nonwoven fabric used for the present invention can be subjected to mechanical compaction by a microcreping process. The particular microcreping process employed was that as is commercially available from the Micrex Corporation of Walpole, Mass., and is referred to by the registered mark of the same company as "MICREX". The apparatus for performing MICREXING is described in U.S. Pat. Nos. 3,260,778; 3,416,192; 3,810,280, 4,090,385; and 4,717,329, all hereby incorporated by reference. In such an apparatus, a means for imparting pressure applies a predetermined amount of pressure through a substructure, and extending across the path of a continuously supplied sheet of nonwoven fabric. The nonwoven fabric is carried by a rotating drive roll on which the pressure is imparted through the nonwoven fabric and against the rotating drive roll. While the nonwoven fabric is under applied pressure it then further impinges upon a retarding surface. This retarding surface in combination with the applied pressure induces the fabric into a creped form, with a resulting distortion of constituent fibrous components out of the planar aspect of the original nonwoven fabric.

From the foregoing, numerous modifications and variations can be effected without departing from the true spirit and scope of the novel concept of the present invention. It is to be understood that no limitation with respect to the specific embodiment disclosed herein is intended or should be inferred. The disclosure is intended to layer, by the appended claims, all such modifications as fall within the scope of the claims.

What is claimed is:

1. A method of protecting automotive surfaces, comprising the steps of:

provinding at least one piece of nonwoven fabric formed from fibrous or filamentary elements;

forming a substantially planar sheet from said nonwoven fabric;

cutting said planar sheet to a selected length to form a protective layer;

providing a truck-bed liner separate from said protective layer; and positioning said protective layer between a truck-bed liner and a truck-bed so that said protective layer contacts said truck-bed to protect the truck-bed from abrasion and moisture.

2. A method of protecting automotive surfaces in accordance with claim 1, wherein:

said nonwoven fabric comprises heat-bonded, polymeric staple length fibers.

3. A method of protecting automotive surfaces in accordance with claim 1, wherein:

said nonwoven fabric comprises hydroentangled staple length fibers.

4. A method of protecting automotive surfaces in accordance with claim 1, wherein:

said nonwoven fabric comprises adhesive-bonded fibrous material.

5. A method of protecting automotive surfaces in accordance with claim 1, wherein:

said nonwoven fabric comprises substantially continuous polymeric filaments.

6. A method of protecting automotive surfaces in accordance with claim 1, wherein:

said nonwoven fabric is non-apertured.

* * * * *